US009280364B2

(12) United States Patent
Lee et al.

(10) Patent No.: US 9,280,364 B2
(45) Date of Patent: Mar. 8, 2016

(54) APPARATUS AND METHOD FOR SELECTIVE LOADING IN MOBILE COMMUNICATION TERMINAL

(75) Inventors: Jae-Min Lee, Seoul (KR); Jang-Hyun Yoon, Yongin-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 1500 days.

(21) Appl. No.: 12/173,242

(22) Filed: Jul. 15, 2008

(65) Prior Publication Data

US 2009/0024562 A1    Jan. 22, 2009

(30) Foreign Application Priority Data

Jul. 18, 2007 (KR) .................. 10-2007-0071852

(51) Int. Cl.
G06F 13/00 (2006.01)
G06F 9/445 (2006.01)
G06F 9/45 (2006.01)

(52) U.S. Cl.
CPC .............. *G06F 9/445* (2013.01); *G06F 8/4434* (2013.01)

(58) Field of Classification Search
USPC ......................................................... 717/174
See application file for complete search history.

(56) References Cited

U.S. PATENT DOCUMENTS 5,819,115 A * 10/1998 Hoese et al. .................... 710/68
7,054,649 B2 * 5/2006 Yamazaki et al. ......... 455/456.3
7,548,902 B2    6/2009 Bidet et al.

FOREIGN PATENT DOCUMENTS

| CA | 2 511 197 A1 | 12/2006 |
| CN | 1477895 A | 2/2004 |
| CN | 1614561 A | 5/2005 |
| KR | 10-0564524 B1 | 3/2006 |

OTHER PUBLICATIONS

NetworkClue.com, "MSConfig" published Mar. 21, 2005 (http://www.networkclue.com/os/windows/commands/msconfig.aspx).*
NetworkClue.com, published Mar. 21, 2005 (http://www.networkclue.com/os/windows/commands/msconfig.aspx; hereinafter "NetworkClue").*
Timothy Parker Consulting Incoporated, Norton Uninstall Deluxe (Online), Jan. 23, 2007, pp. 1-2, XP002495363, Retrieved from the Internet: URL http://tparker.com/norton_uninstall_deluxe.htm.
Tae-Hoon Kang et al., A Seamless Service Management with Context-Aware Handoff Scheme in Ubiquitous Computing Environment, Management of Convergence Networks and Services Lecture Notes in Computer Science, LNCS, Jan. 1, 2006, pp. 132-141, vol. 4238, Springer, Berlin, DE, XP019044537.
T. Yager, The deep, dark registry. I Windows NT, UNIX Review, May 1, 1997, vol. 15, No. 5, San Francisco, CA, US.
M. Russinovich et al., Examining the Windows 95 Registry, Windows Developer Journal, Oct. 1, 1996, pp. 35-38, Miller Freeman, Lawrence, KS, US, XP001051908.

* cited by examiner

Primary Examiner — H S Sough
Assistant Examiner — Deric Ortiz
(74) Attorney, Agent, or Firm — Jefferson IP Law, LLP (57) ABSTRACT

An apparatus and a method for enhancing memory utilization by compressing unused programs and their system files are provided. The method for generating a profile for a selective loading of a terminal includes receiving a selection of at least one application program that is to be activated, identifying that there is at least one application program to be activated among present deactivated application programs and to be deactivated among present activated application programs, compressing other application programs and system files related to the other application programs than at least one application program to be activated and generating a profile comprising a list of at least one application program to be activated.

18 Claims, 8 Drawing Sheets

APPARATUS AND METHOD FOR SELECTIVE LOADING IN MOBILE COMMUNICATION TERMINAL

PRIORITY

This application claims the benefit under 35 U.S.C. §119 (a) of a Korean patent application filed in the Korean Intellectual Property Office on Jul. 18, 2007 and assigned Serial No. 2007-0071852, the entire disclosure of which is hereby incorporated by reference.

BACKGROUND OF THE INVENTION

1. Field of the Invention

The present invention relates to operational control of a mobile communication terminal. More particularly, the present invention relates to an apparatus and a method for allowing a user to select and change application programs that are loaded on a terminal.

2. Description of the Related Art

Figure 1A:
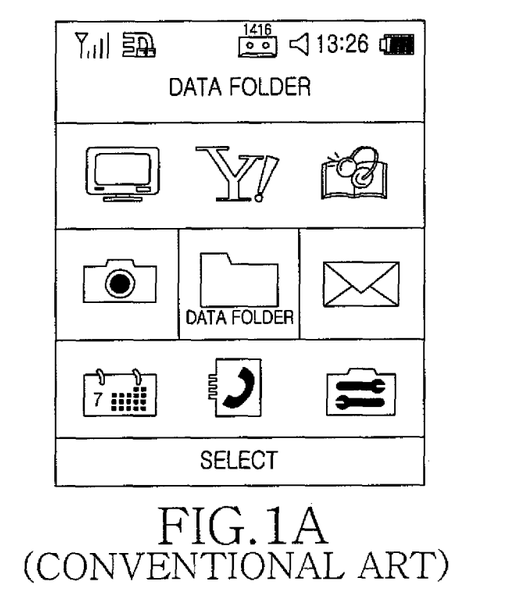
FIGS. 1A and 1B are diagrams illustrating a menu and a memory status of a conventional terminal.

A conventional mobile communication terminal (hereinafter referred to as a 'terminal') provides not only a voice communication service but also various additional application programs such as a camera function, a multimedia player function, a messaging function, and the like. However, a user of a conventional terminal must utilize the additional application programs only in a manner defined by a manufacturer/provider as shown in FIG. 1A. That is, as illustrated in FIG. 1A, the additional application programs of the terminal are automatically loaded and presented as icons on a user interface screen by the terminal.

In the conventional manner defined by the manufacturer/provider, an operating system of the conventional terminal does allow a user to selectively register or deregister items as menu items. That is, the conventional terminal allows a user to select or register which of the additional functions will appear as icons on the user interface screen.

However, the registration and deregistration performed by the user merely refers to the addition and deletion of the connection to the user interface. In other words, the registration/deregistration only refers to selection of the corresponding icon to be illustrated on the user interface. It does not imply that the specific application program, including its middleware, engine, and related library, are added or deleted to or from the terminal memory.

Figure 1B:
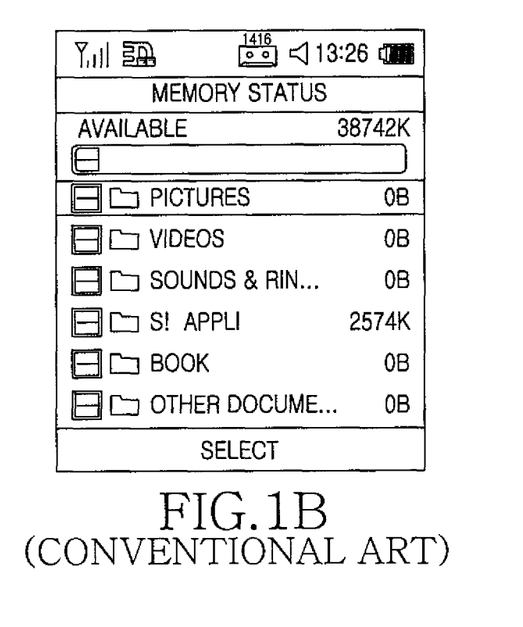

As a result, application programs that are selected for deregistration because they are not actually used by the user are still loaded in the terminal memory as shown in FIG. 1B. Furthermore, the application's related data and system files are also loaded in the memory. For example, as illustrated in FIG. 1B, even though the PICTURES function is not used by the user, as indicated by 0 bits being stored in association with that function, the PICTURES application itself is still loaded in the terminal memory.

To address the inefficiency created when the unused application programs and their system files are loaded in to the memory, suggested methods attempt to enhance the memory utilization by setting a timer, periodically checking validity of data in the memory at regular intervals, and deleting invalid data from the memory.

However, those suggested methods do not truly address the poor memory utilization because the unused application programs and their system files still effectively remain in the memory all the time.

SUMMARY OF THE INVENTION

An aspect of the present invention is to address at least the above mentioned problems and/or disadvantages and to provide at least the advantages described below. Accordingly, an aspect of the present invention is to provide an apparatus and a method for selective loading in a mobile communication terminal.

Another aspect of the present invention is to provide an apparatus and a method of a mobile communication terminal for allowing a user to select application programs according to his/her inclination and purpose and to generate a profile including a list of the selected application programs, not loading application programs and system files unrelated to the generated profile, excluding necessary programs for operations of the mobile communication terminal, and excluding them from a menu when the generated profile is selected.

Yet another aspect of the present invention is to provide an apparatus and a method of a mobile communication terminal for allowing a user to select application programs according to his/her inclination and purpose and to generate a profile including a list of the selected application programs, not loading application programs and system files unrelated to the generated profile, excluding necessary programs for operations of the mobile communication terminal, excluding them from a menu when the generated profile is selected, and compressing the unloaded application programs and system files.

In accordance with an aspect of the present invention, a method for generating a profile for a selective loading of a terminal is provided. The method includes receiving a selection of at least one application program that is to be activated, identifying that there is at least one application program to be activated among present deactivated application programs and to be deactivated among present activated application programs, compressing other application programs and system files related to the other application programs than at least one application program to be activated and generating a profile comprising a list of at least one application program to be activated.

In accordance with another aspect of the present invention, a terminal for generating a profile for a selective loading is provided. The terminal includes an application profile manager for receiving a selection of at least one application program that is to be activated, identifying that there is at least one application program to be activated among present deactivated application programs and to be deactivated among present activated application programs, compressing other application programs and system files related to the other application programs than at least one application program to be activated, and for generating a profile comprising a list of at least one application program to be activated.

In accordance with still another aspect of the present invention, a method for a selective loading of a terminal is provided. The method includes determining whether there is a profile for the selective loading and when there is the profile, loading an application program to be activated and a system file related to the application program to be activated based on the profile.

In accordance with yet another aspect of the present invention, a terminal for selectively loading is provided. The terminal includes an application profile manager for determining whether there is a profile for the selective loading, and when there is the profile, loading an application program to be activated and a system file related to the application program to be activated based on the profile.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and a method for selective loading of application functions in a mobile communication terminal.

Figure 2:
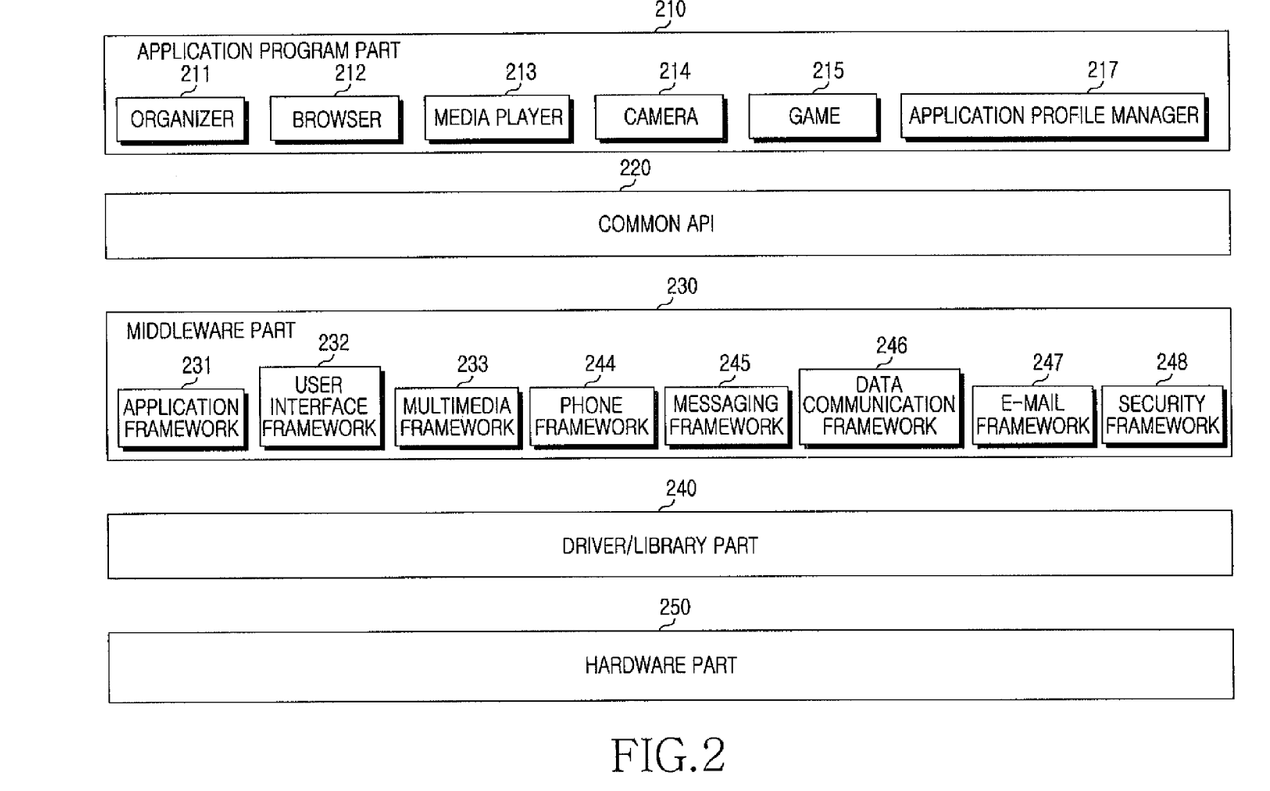
FIG. 2 is a diagram illustrating an internal platform of a terminal for selective loading according to an exemplary embodiment of the present invention.

FIG. 2 is a diagram illustrating an internal platform of a terminal for the selective loading according to an exemplary embodiment of the present invention.

The internal platform of FIG. 2 includes an application program part 210, a common Application Program Interface (API) part 220, a middleware part 230, a driver/library part 240, and a hardware part 250.

The application program part 210 includes application programs that may be run directly by a user. As an example, the application program part 210 may include applications such as an organizer 211, a browser 212, a media player 213, a camera 214, a game 215 and the like. According to an exemplary implementation, the application program part 210 also includes an application profile manager 217 for receiving and listing application programs to be deactivated from a user and for generating profile information.

The common API part 220 provides a program interface for executing system files of a lower layer related to an application program executed by a user.

The middleware part 230 is a set of program codes executed by commands of the application program. According to the purpose of the operation, the middleware part 230 can include an application framework 231, a user interface framework 232, a multimedia framework 233, a phone framework 244, a messaging framework 245, a data communication framework 246, a E-mail framework 247, a security framework 248 and the like.

The driver/library part 240 is used to activate relevant hardware when the application program runs and the relevant hardware is needed.

The hardware part 250 represents electronic and mechanical elements of the terminal and includes a modem, a media player chip, a vibration motor, a display, a speaker, and so forth.

Through the application profile manager 217, the user lists his/her favorite application programs to be activated. Also through the application profile manager 217, the user sets the profile and stores the profile in the memory of the terminal. In an exemplary implementation, the user may store a plurality of profiles, wherein each profile is tailored to a specific environment or use, for example a business profile, a personal profile and the like.

When a particular application program of the application program part 210 is selected to be activated as part of a profile, the terminal loads the framework or module related to the selected application program for display and potential execution by the user. However, the terminal does not load frameworks or modules unrelated to the particular application program in the middleware 230. That is, the terminal does not load frameworks for application programs that are not activated as part of the profile.

Except for necessary programs required for the proper execution of the terminal, the terminal does not load application programs and system files unrelated to the generated profile and excludes them from a menu. That is, the terminal deactivates the unrelated applications and system files.

For instance, when the user selects, sets, and stores only the application program of the media player 213 as a music profile, the terminal only loads the media player 213 as the application program. The terminal does not load the application programs unselected in the music profile, such as the organizer 211, the browser 212, the camera 214 and the game 215, and their system files such as middleware, driver and library.

Likewise, when the user selects, sets, and stores the application program of the game 215 as a game profile, the terminal does not load the application programs unselected in the game profile, such as the organizer 211, the browser 212, the camera 214 and the media player 213, and their system files such as middleware, driver and library.

Figure 3:
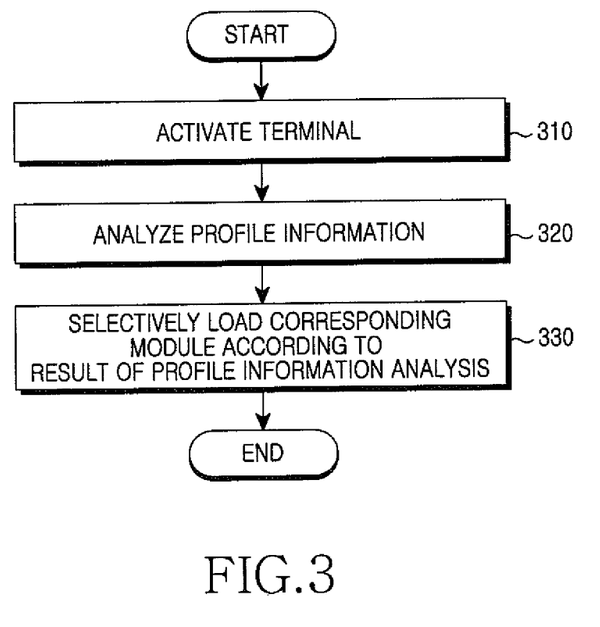
FIG. 3 is a flowchart illustrating a selective loading method according to an exemplary embodiment of the present invention.

FIG. 3 is a flowchart illustrating a selective loading method according to an exemplary embodiment of the present invention.

In step 310, the terminal is activated, for example by a powering-on operation. Once activated, the terminal analyzes the profile information in step 320. The profile information includes the list of application programs to be loaded by the terminal.

In step 330, the terminal selectively loads the corresponding module or modules according to the result of the profile information analysis. In more detail, the terminal loads the application programs and their associated system files that are selected in the profile and does not load application programs or their system files that are not selected in the profile, in other words, those that are unrelated to the profile. When the application modules that are selected as part of the profile are loaded, the terminal includes those applications in appropriate menus that may be displayed for the user. Also, the terminal excludes from the menu the application modules that are not selected in the profile. That is, the terminal deactivates the unrelated application programs and their system files. Of course, the selective loading of the appropriate modules does not include the exclusion of programs necessary for the running of the terminal.

Next, the terminal finishes this process.

Figure 4:
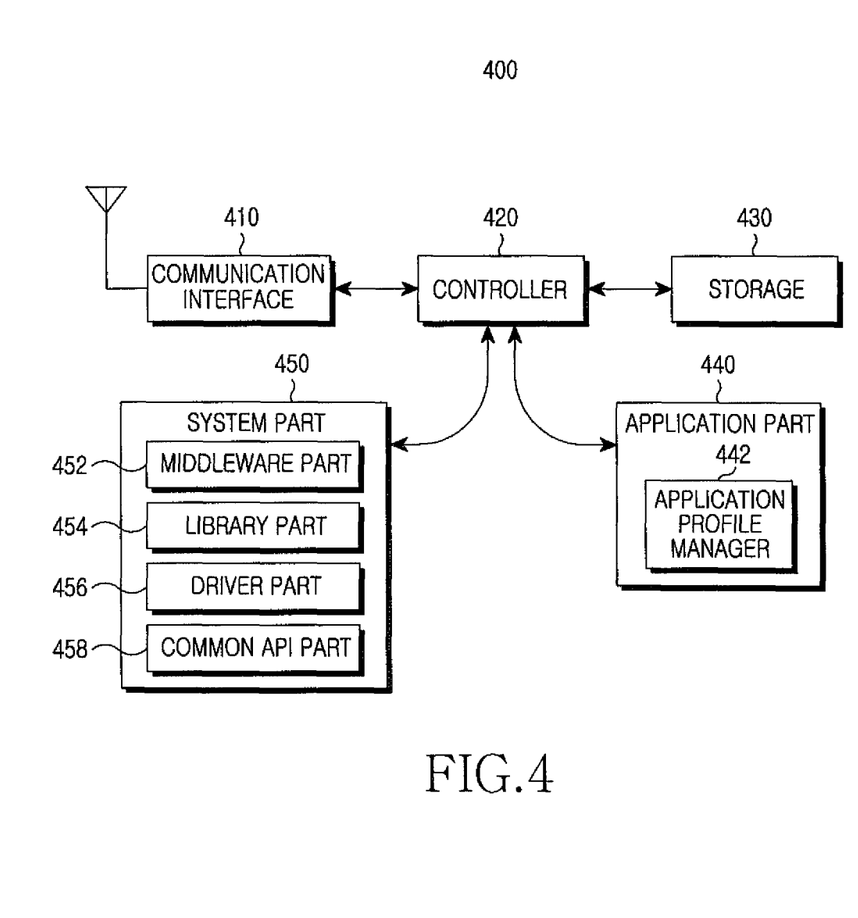
FIG. 4 is a block diagram of a terminal for selective loading according to an exemplary embodiment of the present invention.

FIG. 4 is a block diagram of a terminal for selective loading according to an exemplary embodiment of the present invention.

The terminal 400 as illustrated in FIG. 4 includes a communication interface 410, a controller 420, a storage 430, an application part 440 and a system part 450.

The communication interface 410, which is a module for communicating with other nodes, includes a wireless processing module and a baseband processing module.

The wireless processing module converts a signal received via an antenna to a baseband signal and provides the baseband signal to the baseband processing module. The wireless processing module also converts a baseband signal output from the baseband processing module to a radio signal transmittable over the air and transmits the radio signal via the antenna.

The storage 430 stores programs for controlling the operations of the terminal and temporary data generated in the program executions. The storage 430 includes both volatile and non-volatile memory.

The application part 440 includes application programs such as games, a camera function, a media player, and the like for operating in the terminal. More particularly, the application part 440 includes an application profile manager 442.

The application profile manager 442 receives the applications that are selected to be activated from the user and generates a profile. The profile can include a list of the application programs to be activated, and a list of middleware, drivers, and libraries related to the activated application programs.

The system part 450 provides executing conditions for executing the application part 440. The system part 450 includes a middleware part 452, a library part 454, a driver part 456, and a common API part 458.

The controller 420 is responsible for basic processing and controlling of the terminal. For example, the controller 420 processes and controls data communications and performs typical functions. In addition, the controller 420 controls the system part 450 and the application part 440. According to the profile information, the controller 420 does not load the application programs that are not selected as part of the profile. That is, the controller 420 does not load the application programs to be deactivated and their system files in the operation.

In an exemplary implementation, the controller 420 can function as the system part 450 and the application part 440 and accordingly be provided as an integrated unit including those parts. In FIG. 4, the system part 450 and the application part 440 are separately provided to illustrate their respective functions.

In the actual implementation, the controller 420 may process all or part of the functions of the system part 450 and the application part 440.

Now, an exemplary embodiment of the present invention is described in a case with the application profile manager and in a case without the application profile manager.

Figure 5:
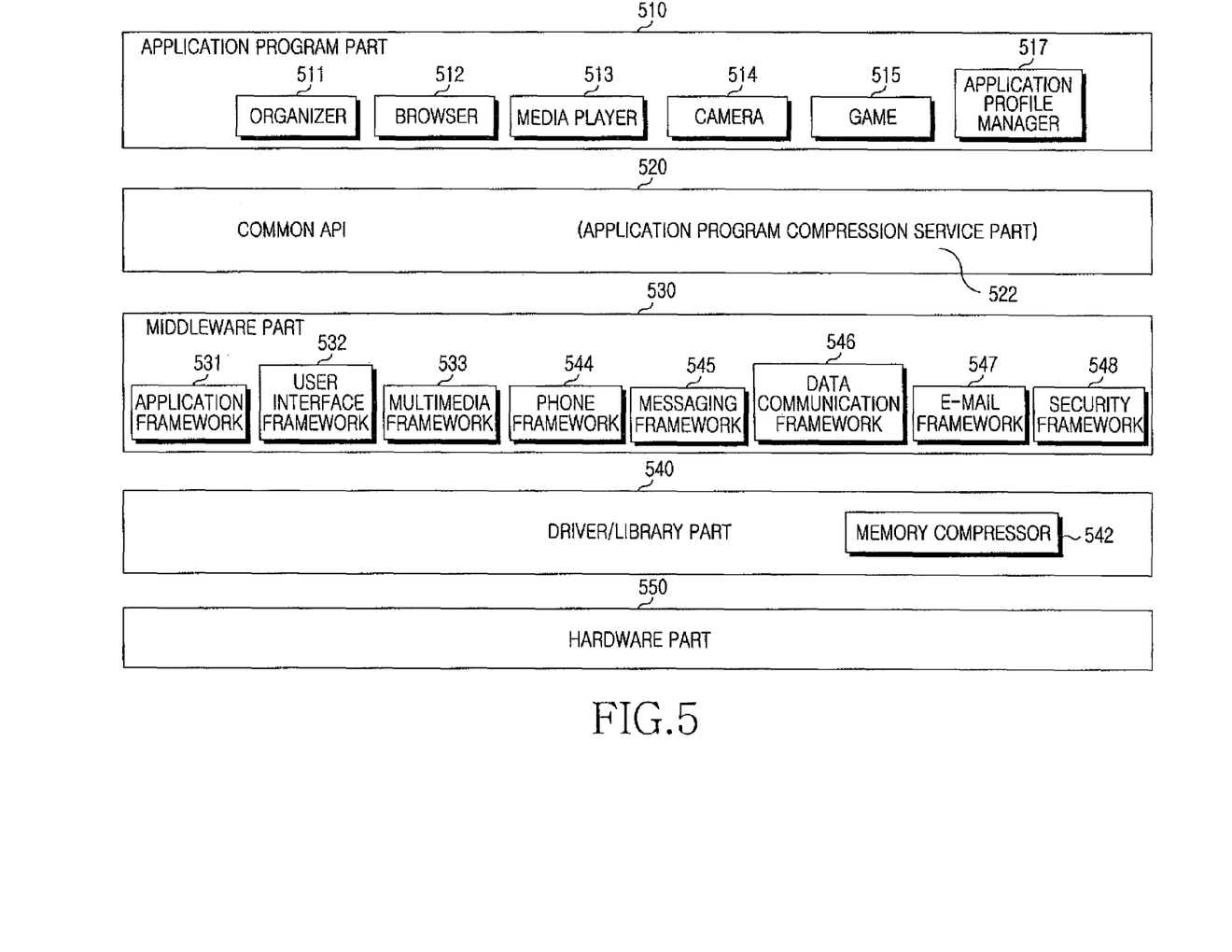
FIG. 5 is a diagram illustrating an internal platform of a terminal for selective loading according to an exemplary embodiment of the present invention.

FIG. 5 is a diagram illustrating an internal platform of a terminal for selective loading according to an exemplary embodiment of the present invention.

The internal platform of FIG. 5 includes an application program part 510, a common API part 520, a middleware part 530, a driver/library part 540, and a hardware part 550.

The application program part 510 includes application programs run by the user. The application programs may include an organizer 511, a browser 512, a media player 513, a camera 514, a game 515 and the like. According to another exemplary embodiment of the present invention, the application program part 510 includes an application profile manager 517 which receives information from the user regarding application programs that are to be activated or deactivated and generates profiles according to the received information.

The common API part 520 provides a program interface for executing system files of a lower layer related to the application program. In an exemplary implementation, the common API part 520 further includes an application program compression service part 522 which compresses the application program and provides a program interface for the compression and decompression.

The middleware part 530 includes a set of program codes executed by commands of the application program. According to the purpose of the operation, the middleware part 530 can include an application framework 531, a user interface framework 532, a multimedia framework 533, a phone framework 544, a messaging framework 545, a data communication framework 546, an E-mail framework 547, a security framework 548 and the like.

The driver/library part 540 includes programs for driving the hardware that are used to activate the related hardware when the application programs run. In an exemplary implementation, the driver/library part 540 further includes a memory compressor 542 for the compression and decompression.

The memory compressor 542 compresses the application programs, including their system files, which are to be deactivated. The compressed programs and system files are stored in the memory. As appropriate, the memory compressor 542 also decompresses the compressed programs and files.

The hardware part 550 represents electronic and mechanical elements of the terminal, and may include a modem, a media player chip, a vibration motor, a display, a speaker, and so forth.

Through the application profile manager 517, the user lists his/her favorite application programs, sets and stores them as a separate profile.

When the profile is applied, the mobile communication terminal compresses the application programs that are not part of the profile. That is, the terminal compresses the programs that are to be deactivated, including their system files.

When a specific application program of the application program part 510 is selected to be activated, the mobile communication terminal compresses frameworks, unrelated to the selected application program, in the middleware part 530 and the driver/library part 540 and does not load them in the operation.

Except for programs necessary for its operation, the mobile communication terminal compresses application programs and system files unrelated to the generated profile, does not load them in the operation, and excludes them from the menu. That is, the terminal deactivates the unrelated applications and system files.

For instance, when the user selects only the application program of the media player 513 and sets and saves it as a music profile, the terminal compresses the application programs unselected in the music profile. That is the terminal compresses the unselected applications such as the camera 514 and the game 515, and their associated system files such as middleware, driver, library and the like and does not load them in the operation.

Likewise, when the user selects the application program of the game 515, and sets and saves it as a game profile, the terminal compresses the application programs unselected in the game profile, such as the camera 514 and the media player 513, and their associated system files such as middleware, driver and library, and does not load them in the operation.

Without the application profile manager 517, every system file is loaded. In this case, only the application programs to be deactivated can be compressed.

Figure 6:
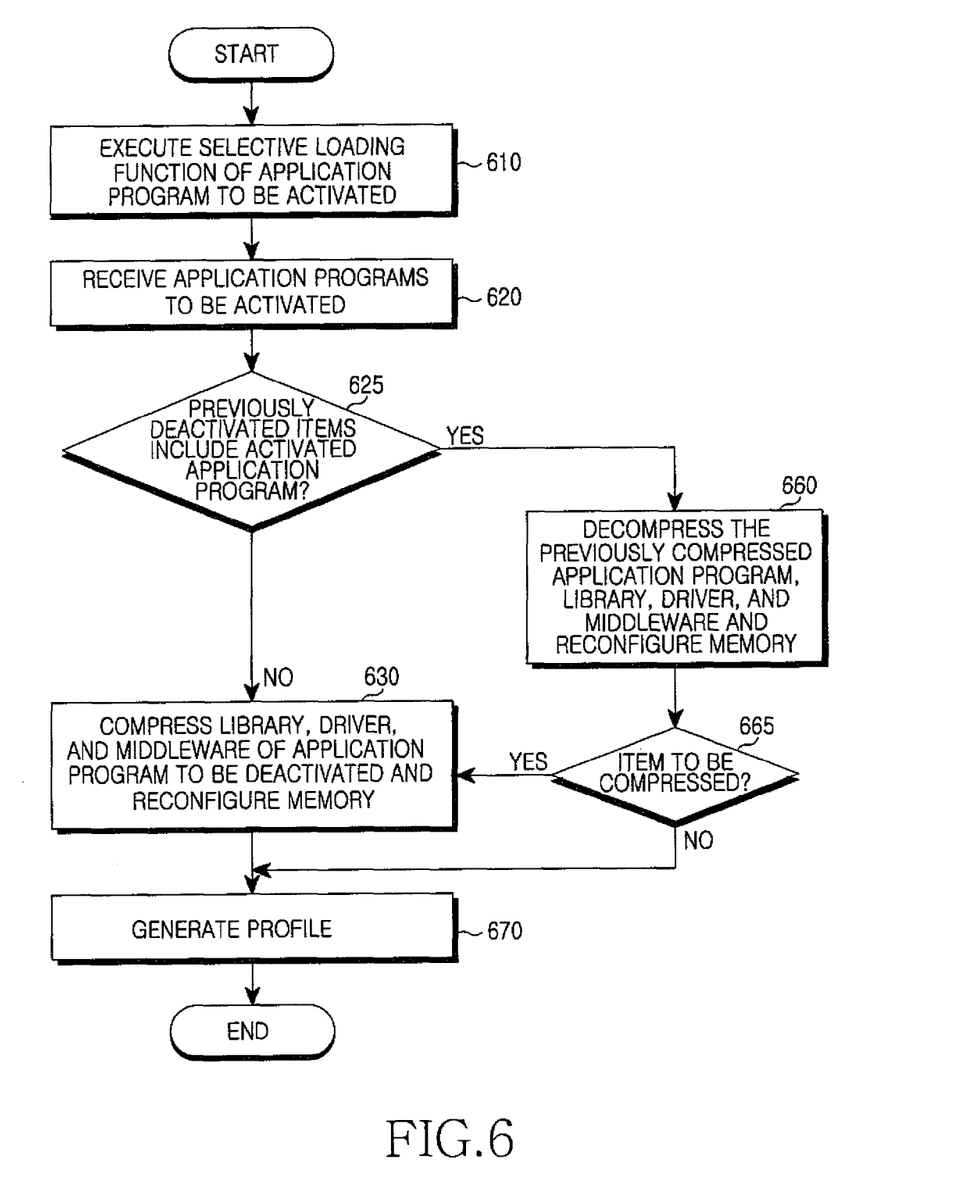
FIG. 6 is a flowchart illustrating a profile generating method for selective loading according to an exemplary embodiment of the present invention.

FIG. 6 is a flowchart illustrating a profile generating method for selective loading according to an exemplary embodiment of the present invention.

After the mobile communication terminal is activated, a selective loading function is executed in step 610. That is, the terminal launches a selective loading function by which the user may select which application programs are to be activated. Launching of the selective loading function and inputting by the user of the selected function may be performed through a menu screen provided by the terminal. The terminal receives one or more application programs selected to be activated in step 620.

In step 625, the terminal determines if the selected application programs received in step 620 include programs that were previously deactivated and thus compressed. When it is determined that a previously deactivated item is to be a newly activated item in step 625, the terminal proceeds to step 660. In step 660, the terminal decompresses the corresponding previously compressed application program and its associated system file such as library, driver, middleware and the like that were also compressed, and reconfigures the memory.

In step 665, the terminal determines if an application is to be compressed. That is, the terminal determines if an application is not selected and is thus to be deactivated, If there is an application that is not selected, the terminal compresses the application program including its associated system file such as library, driver, middleware and the like and reconfigures the memory in step 630.

In step 670, the terminal generates a profile including the application program to be activated and its related system file.

By contrast, when it is determined that there is no new item to be activated among the existing deactivated items in step 625, the terminal compresses the application programs to be compressed. That is, the terminal compresses the application programs to be deactivated including their associated system files such as library, driver, middleware and the like and reconfigures the memory in step 630.

Next, the terminal generates a profile including the application program to be activated and its related system file in step 670 and then finishes this process.

Figure 7:
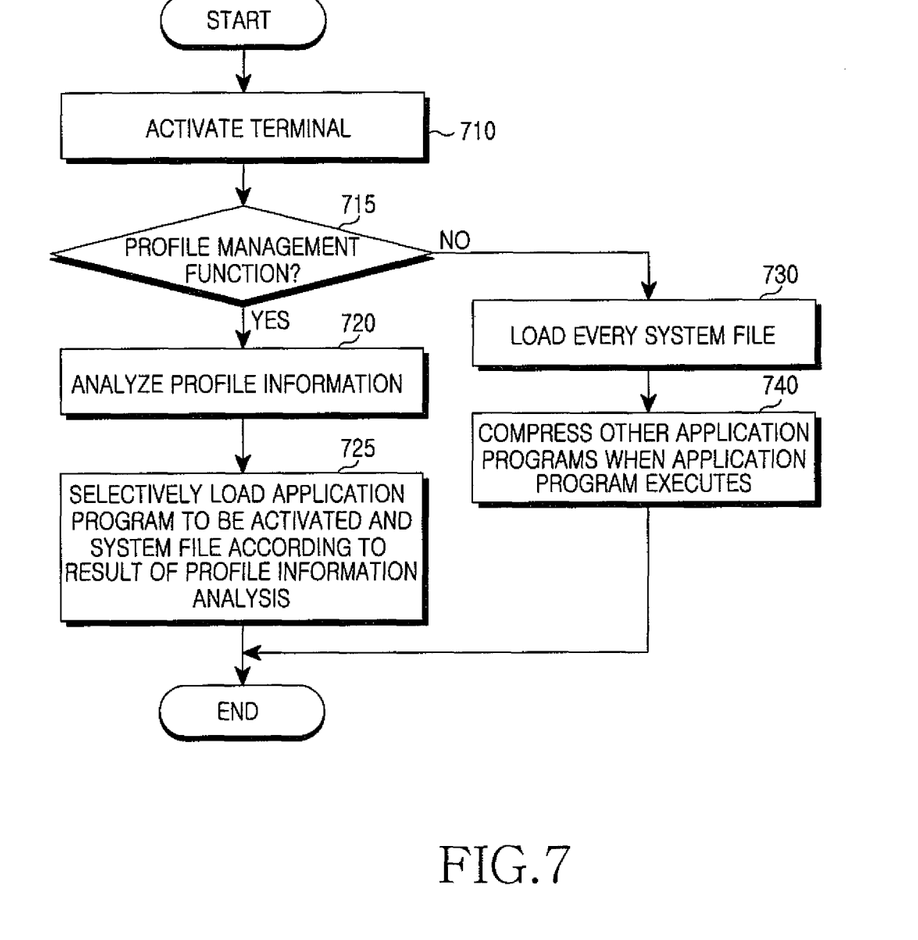
FIG. 7 is a flowchart illustrating a selective loading method according to an exemplary embodiment of the present invention.

FIG. 7 is a flowchart illustrating a selective loading method according to an exemplary embodiment of the present invention.

In step 710, the terminal is activated. After activation, the terminal determines if the profile management function is selected in step 715. If the profile management function is selected in step 715, the terminal analyzes the profile information in step 720. According to the result of the profile information analysis, the terminal selectively loads the application program to be activated and its associated system file in step 725.

When the profile management function is not selected in step 715, the terminal loads every system file in step 730. In the execution of the application program, the terminal compresses other application programs not executing in step 740.

Although it is not illustrated in FIG. 7, before the execution of the application program, if the application program has been compressed, it is first decompressed and then executed.

Next, the terminal finishes this process.

Figure 8:
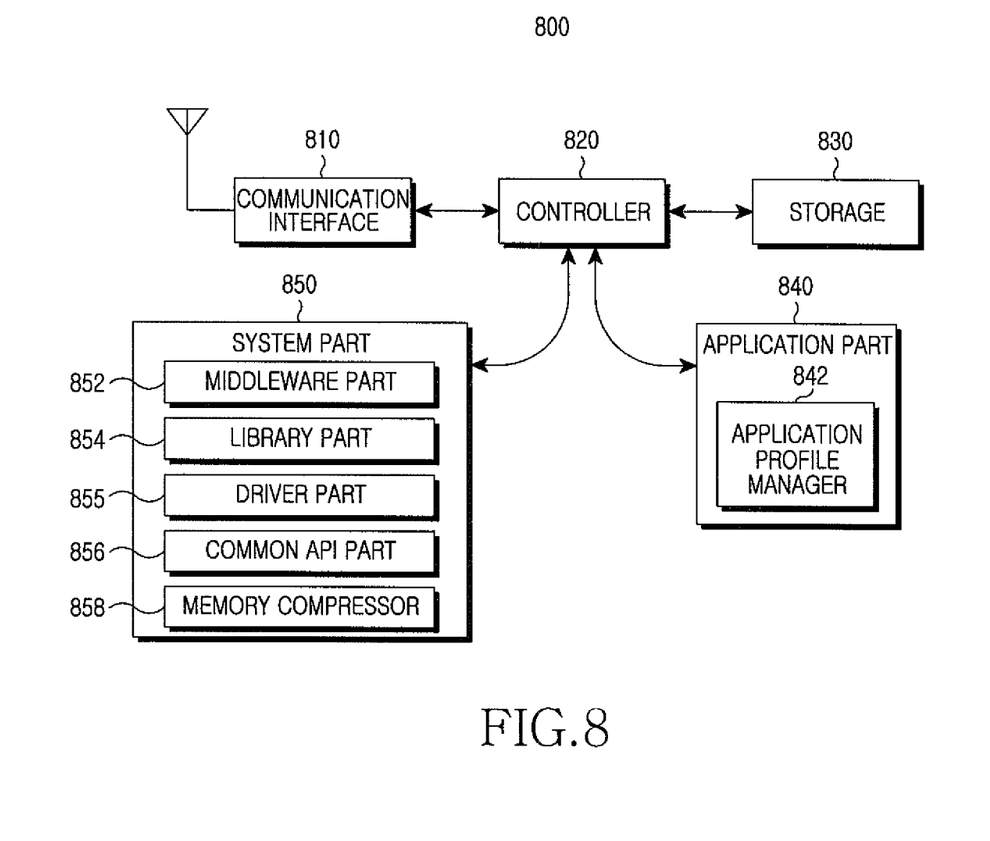
FIG. 8 is a block diagram of a terminal for selective loading according to an exemplary embodiment of the present invention.

FIG. 8 is a block diagram of a terminal for selective loading according to an exemplary embodiment of the present invention.

The terminal 800 as illustrated in FIG. 8 includes a communication interface 810, a controller 820, a storage 830, an application part 840 and a system part 850.

The communication interface 810, which is a module for communicating with other nodes, includes a wireless processing module and a baseband processing module.

The wireless processing module converts a signal received via an antenna to a baseband signal and provides the baseband signal to the baseband processing module. The wireless processing module also converts a baseband signal output from the baseband processing module to a radio signal transmittable over the air and transmits the radio signal via the antenna.

The storage 830 stores programs for controlling the operations of the terminal and temporary data generated in the program execution. The storage 830 includes both volatile and non-volatile memory.

The application part 840 includes application programs such as a game, a camera, a media player and the like, operating in the terminal. More particularly, the application part 840 includes an application profile manager 842.

The application profile manager 842 receives the applications that are selected to be activated from the user and generates a profile. The profile can include a list of the application programs to be activated. Based on the list, the application programs to be deactivated and their related system files are compressed.

The system part 850 provides executing conditions for executing the application part 840. The system part 850 includes a middleware part 852, a library part 854, a driver part 855, a common API part 856, and a memory compressor 858 for the compression.

The memory compressor 858 compresses application programs to be deactivated and their related system files based on the profile. When the terminal does not provide the profile management function, the memory compressor 858 compresses unused application programs.

The common API part 856 further includes an application program compression service part for providing a program interface for the compression function. Namely, the application program compression service part provides the program interface for the compression.

A controller 820 is responsible for basic processing and controlling of the terminal. For example, the controller 820 processes and controls data communications and performs typical functions. In addition, the controller 820 controls the system part 850 and the application part 840. According to the profile information, the controller 820 does not load the deactivated application programs and their system files in the operation.

When the application profile manager 842 is not provided, the controller 820 can control to compress only application programs currently not in the operation.

As constructed above, the controller 820 can function as the system part 850 and the application part 840. Herein, the system part 850 and the application part 840 are separately provided to illustrate their respective functions.

In the actual implementation, the controller 820 may process all or part of the functions of the system part 850 and the application part 840.

In light of the foregoing, the mobile communication terminal compresses unused application programs and their related system files, rather than loading them in the memory. Therefore, the memory utilization can be enhanced by assigning more memory for data storage and the like.

Additionally, since the unused application programs are deleted from the menu of the user interface, the menu can be simplified. Without having to load all the application programs and the system files, the booting speed can be made quicker.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for selectively loading in a terminal, the method comprising:
   receiving an input for selecting at least one application program;
   determining whether the selected application program is deactivated;
   activating, when the selected application program is deactivated, the selected application program by decompressing the selected application program;
   deactivating the other of the at least one application program by compressing the other application programs;
   loading, when the terminal is activated, the activated application program;
   receiving an input for executing at least one of the deactivated application programs;
   re-activating the at least one of the deactivated application programs by decompressing the at least one of the deactivated application programs; and
   executing the re-activated application program.

2. The method of claim 1, wherein the deactivating of the other application programs comprises compressing system files related to the other application programs.

3. The method of claim 1,
   wherein the activating of the selected application program comprises decompressing system files related to the selected application program.

4. The method of claim 2, wherein the system files comprise at least one of a driver, a library, and a framework.

5. The method of claim 3, wherein the system files comprise at least one of a driver, a library, and a framework.

6. The method of claim 1, further comprising:
   generating a profile indicating the activated application program.

7. The method of claim 6, wherein the profile indicates system files related to the activated application program together with the activated application program.

8. The method of claim 6, wherein the loading of the activated application program comprises loading the activated application program by analyzing the profile.

9. The method of claim 1, wherein the receiving of the input for selecting at least one of the application programs comprises:
   providing a menu screen;
   executing a selective loading function corresponding to a selection of a user through the menu screen; and
   receiving the input for selecting at least one of the application programs in the selective loading function.

10. A terminal for selectively loading, the terminal comprising:
    an application part configured to:
      receive an input for selecting at least one application program,
      determine whether the selected application program is deactivated,
      activate, when the selected application program is deactivated, the selected application program by decompressing the selected application program, and
      deactivate the other of the application programs by compressing the other application programs; and
    a controller configured to load, when the terminal is activated, the activated application program,
    wherein the application part receives an input for executing at least one of the deactivated application programs, re-activates the at least one of the deactivated application programs by decompressing the at least one of the deactivated application programs, and executes the re-activated application program.

11. The terminal of claim 10, wherein the application part comprises system files related to the other application programs.

12. The terminal of claim 10, wherein the application part decompresses system files related to the application programs.

13. The terminal of claim 11, wherein the system files comprise at least one of a driver, a library, and a framework.

14. The terminal of claim 12, wherein the system files comprise at least one of a driver, a library, and a framework.

15. The terminal of claim 10, wherein the application part comprises an application profile manager configured to generate a profile indicating the activated application program.

16. The terminal of claim 15, wherein the profile indicates system files related to the activated application program together with the activated application program.

17. The terminal of claim 15, wherein the controller loads the activated application program by analyzing the profile.

18. The terminal of claim 10, wherein the application part provides a menu screen, executes a selective loading function corresponding to a selection of a user through the menu screen, and receives the input for selecting at least one of the application programs in the selective loading function.

* * * * *